Jan. 26, 1965    LA VERGNE H. WILLIAMS    3,167,380
TIME CLOCK
Filed Dec. 12, 1963    8 Sheets-Sheet 1

INVENTOR.
La Vergne H. Williams
BY Chapin & Neal
Attorneys

Jan. 26, 1965  LA VERGNE H. WILLIAMS  3,167,380
TIME CLOCK
Filed Dec. 12, 1963  8 Sheets-Sheet 2

INVENTOR.
*La Vergne H. Williams*
BY *Chapin + Neal*
*Attorneys*

Jan. 26, 1965 LA VERGNE H. WILLIAMS 3,167,380
TIME CLOCK
Filed Dec. 12, 1963 8 Sheets-Sheet 6

INVENTOR.
LA VERGNE H. WILLIAMS
BY Chapin & Neal
Attorneys

Jan. 26, 1965 LA VERGNE H. WILLIAMS 3,167,380
TIME CLOCK
Filed Dec. 12, 1963 8 Sheets-Sheet 7

INVENTOR.
LA VERGNE H. WILLIAMS
BY Chapin & Neal
attorneys

Jan. 26, 1965 LA VERGNE H. WILLIAMS 3,167,380
TIME CLOCK
Filed Dec. 12, 1963 8 Sheets-Sheet 8

INVENTOR.
LA VERGNE H. WILLIAMS
BY Chapin & Neal
Attorneys

United States Patent Office 3,167,380
Patented Jan. 26, 1965

3,167,380
TIME CLOCK
La Vergne H. Williams, Columbia, Conn., assignor to Gunver Manufacturing Company, Manchester, Conn., a corporation of Connecticut
Filed Dec. 12, 1963, Ser. No. 331,086
20 Claims. (Cl. 346—82)

The present invention relates to improvements in time recording clocks commonly referred to as "time clocks" and the present application is a continuation-in-part of my prior application Serial No. 103,340, filed April 17, 1961, now abandoned.

According to well-known practices, time clocks are widely employed to obtain a printed record of the time a worker spends on his job to thereby determine the amount of his pay, dependent on the hourly rate at which he is to be paid. With the usual time clock, a worker "punches" or "rings" in and later "punches" out when entering and leaving his work area. The times for punching in and punching out are printed on a time card or some sort of recording sheet. From this time card those responsible for paying the worker first compute the number of hours which have been worked in a given pay period and then compute the amount of the pay for such a period.

Over the years a great number of time clocks have been conceived and made commercially available with various objects in mind. Among such prior time clocks, and with particular reference to certain aspects of the present invention, is the so-called "elapsed-time" time clock which provides not only an indication of the times of arrival and departure, but also automatically indicates the elapsed time which the worker has spent on the job. The advantages of such a time clock are obvious since it is no longer necessary to compute the time the worker has been on the job as a preliminary step in determining the amount of pay he is to receive.

Prior art elapsed-time time clocks have been limited as to the extent that they have been used because of the complexity of their design, and also because they have in many instances been limited to printing but a single elapsed time reading on a given time card.

One of the prime objects of the invention is to overcome the disadvantages of existing elapsed-time time clocks referred to above and to thereby increase the overall use of such time clocks.

Another and more general object is to provide a simplified time clock of general utility.

In accordance with one aspect of the present invention, a time clock is provided which comprises a printing member having a single line of time indicating indicia thereon. This indicia comprises at least two groups of numerals indicating the hours and fractions of hours in a given period, usually of 12 hours' duration. Clock mechanism advances this printing member along a given path which is transverse to a time card positioned in opposed relation thereto. The printing member also has an indicator indicium at the juncture of any two groups of indicia which would move into opposed relation with the card. Means are provided for printining on the time card an impression of at least a portion of said indicia and also an impression of the indicator indicium. Means are provided for placing on said card a second impression of a portion of the same line of indicia, the second impression being offset from the first position and in juxtaposition with the impression of said indicator indicium which then indicates on the second impression the elapsed time between the "in" and "out" printings. Advantageously, the card has a longitudinal line which intersects the first and second printings to indicate the "in" and "out" times.

According to yet another aspect of the invention, the time clock may comprise a printing member having time indicating indicia thereon with clock mechanism being provided for advancing said printing member along a given path. A carrier receives the time card and positions it for engagement with a portion of the printing member. Means are provided for moving said carrier towards and away from the printing member. Means, including an "in" and "out" lever, are provided for actuating the moving means to place on the card an impression of a portion of said indicia, and then to actuate said moving means with the card in the same position relative to the carrier to place on said card an impression of a portion of the indicia with the second impression being offset from the first impression. It is thus possible to obtain a record of the worker's times of arrival and departure which may also be extended to give an elapsed time indication as well.

In accordance with another aspect of the invention, means are provided for actuation of mechanism to print a portion of a single line of indicia on a printing member upon insertion of a card to a given point in a card carrier. Means are then provided for automatically printing a second impression of this single line of indicia in offset relation to the first printing upon insertion of the card to a different relative position on the card carrier. Further, means are provided for printing the next two impressions in greater offset position so that each successive "in" and "out" printings are a clearly identifiable group.

The above and other related objects and features of the invention will be apparent from a reading of the following description of the disclosure found in the accompanying drawings and the novelty thereof pointed out in the appended claims.

In the drawings:

FIG. 1 is an elevation in section of a time clock embodying the present invention with certain parts, and particularly the outer casing thereof, broken away or omitted, with the section following in a general fashion line I—I in FIG. 2;

FIG. 16 is a section, on an enlarged scale, taken on line XVI—XVI in FIG. 10;

FIG. 17 is a view on an enlarged scale, of the printing member employed herein; and FIG. 18 is a view of a time card used with this embodiment of the invention.

Figures 7, 8:
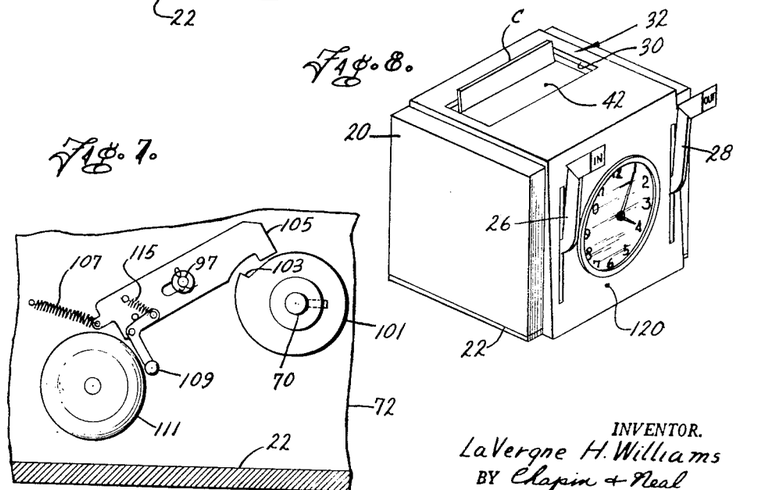
FIG. 7 is a section taken on line VII—VII in FIG. 1.
FIG. 8 is a perspective view on a reduced scale of the present time clock.
Figure 9:
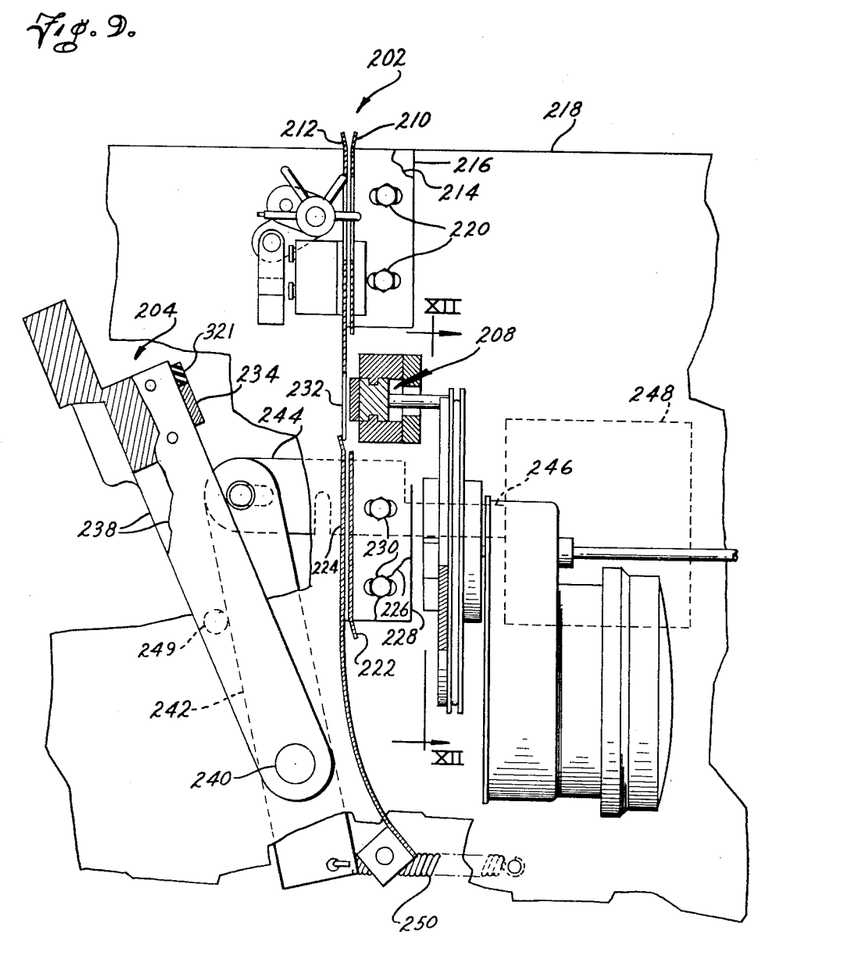
FIG. 9 is a section, taken substantially on line IX—IX in FIG. 10, showing operating mechanism of another embodiment of the invention.

Reference is first made to FIG. 8 for an overall description of the present time clock which comprises an outer casing or housing 20 mounted on a base plate 22. A clock face 24 is mounted on a panel 120 disposed in an opening in the front wall of the housing 20. An "in" lever 26 and an "out" lever 28 are disposed on opposite sides of the clock face 24. The top wall of the housing 20 is slotted at 30 to provide access to a carrier 32 into which is inserted a time card C. Each time a worker reports for work, he inserts the card C in the carrier 32 and then pulls down on the "in" lever 26. When leaving work the card C will again be inserted in the carrier 32 and the "out" lever will then be pulled. The card C will then show the times when the worker arrived and departed and also the elapsed time which was spent on the job, as will later be explained in detail.

Figure 2:
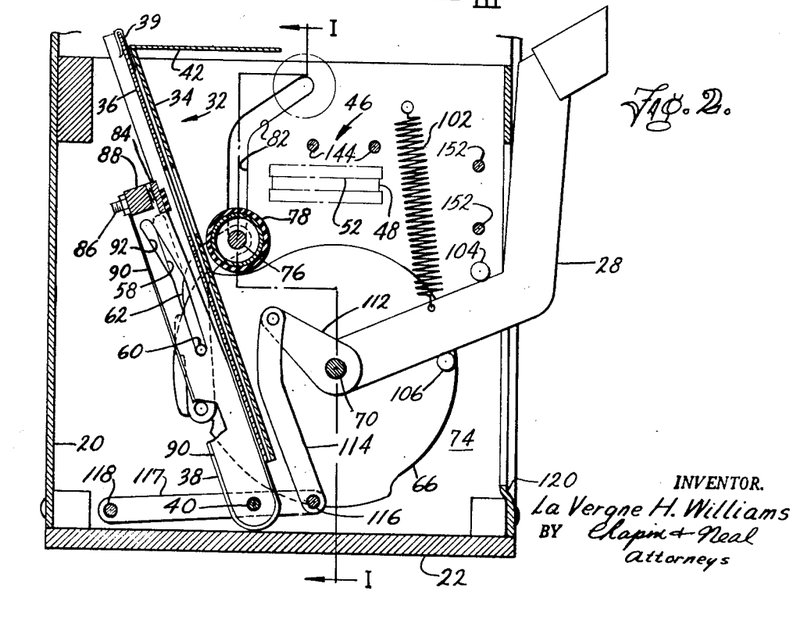
FIG. 2 is a section taken generally on line II—II in FIG. 1 with the clock mechanism thereof omitted.
Figure 3:
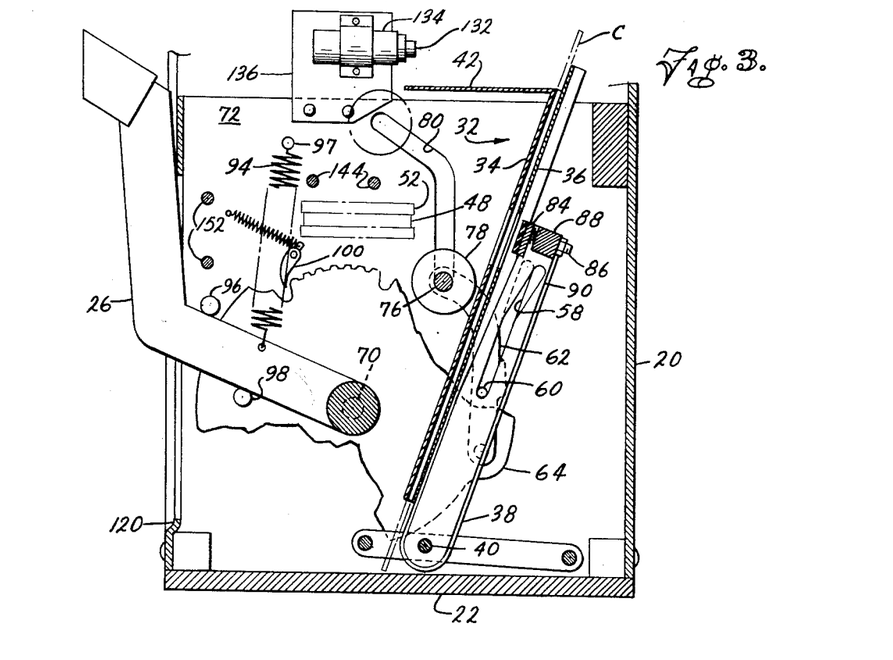
FIG. 3 is a section taken generally on line III—III in FIG. 1 and also with the clock mechanism omitted.

The detailed construction of the time clock will best be understood by now referring to FIGS. 1, 2 and 3. The carrier 32 comprises sheet metal plates 34 and 36 which are flanged along their side edges to facilitate their attachment to levers 38. The plates 34 and 36 define a slot having a width closely approximating the width of the card C and are spaced apart to receive the time card C with spring fingers 39 releasably maintaining the card C at whatever height it is manually positioned in the carrier 32. A plate 42 is secured to the plate 34 and underlies the opening 30 in the cover 20 so as to prevent dirt or the like from falling into the interior of the time clock. The levers 38 are pivotally mounted on a cross shaft 40 for swinging movement of the carrier 32 towards and away from a printing unit 46.

Figure 4:
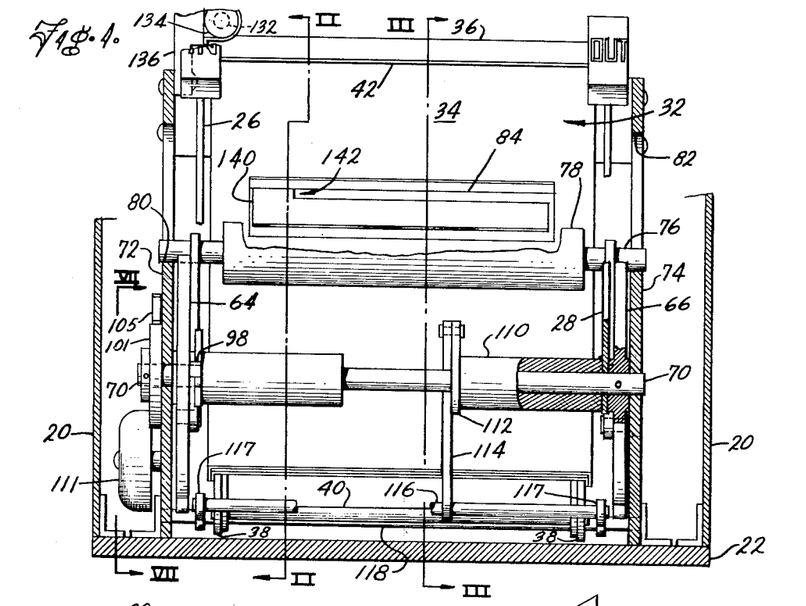
FIG. 4 is a section taken generally on line IV—IV in FIG. 5.

The printing unit 46 comprises an endless band 48 (FIG. 4) which is trained about a pair of pulleys 50. The band 48 has preferably a single line of time indicating indicia 52 running along its length (FIGS. 2, 4 and 5) and formed as a component thereon. The indicia 52 comprise type or printing elements which are formed as an integral part of a flexible strip which is adhered to the band 48. The indicia 52 are arranged in successive series, each indicating a 12-hour period with at least three series of indicia being provided. Opposite the 12:00 o'clock mark or the beginning of each period is an elapsed time indicating indicium 54. Each indicium 54 is also a type character or printing element preferably formed as an integral part of a second flexible band which is secured to the belt 48.

The levers 38 have slots 58 (FIGS. 2 and 3) running lengthwise thereof and respectively receiving pins 60 which project from links 62. The links 62 are pivotally connected to lever plates 64 and 66 respectively. The lever plate 64 is pinned to one end of a shaft 70 while the lever plate 66 is pinned to the other end of the shaft 70. The ends of the shaft 70 are journaled in side plates 72 and 74 respectively. The links 62 rotatably receive at their upper ends, a shaft 76 on which is mounted an inking roll 78. The shaft 76 projects into camming slots 80, 82 formed in the side plates 72, 74 respectively.

With this described arrangement, it will be apparent that upon rotation of either of the lever plates 64 or 66 both of the links 62 will be displaced upwardly as their upper ends are guided by the shaft 76 in the slots 80 and 82. As the links 62 move upwardly, the pins 60 are displaced upwardly in the slots 58, thereby swinging the carrier 32 towards the printing unit 46. At the same time the inking roll 78 passes over the indicia 52 and 54 to provide a fresh supply of ink thereon and thus insure a clear impression on the card C. It will be noted that the ink roll 78 has a central cavity which is filled with ink. The ink can pass from this cavity to the surface of the roll by capillary action through the foraminous structure of the roll, thereby providing a long lasting ink supply.

In order to further insure a clear impression on the card C a printing hammer 84 is provided to firmly press the card C against the indicia 52 and 54. The printing hammer 84 is mounted by screws 86 on a cross bar 88 which is secured at its opposite ends to levers 90 which are also pivotally mounted on the shaft 40. The levers 90 are provided with slots 92 which also receive the pins 60. It will be seen that the lower portions of the slots 58 and 92 are coextensive, but that the slots 92 are angled slightly rearwardly of the slots 58 at their upper ends. Thus, as the links 62 are displaced upwardly by rotation of the lever plates 64 and 66, the carrier 32 will first swing inwardly towards the printing unit 46 until the shaft 76 reaches the bend in the cam slots 80 and 82. Thereafter there will be little or no further movement of the carrier 32 towards the printing unit. However, at this point the pins 60 will reach the rearwardly bent portion of the slots 92 and thereby cam the printing hammer 84 against the card C to cause it to receive an impression from the indicium 52 and 54. It will, of course, be seen that the front and rear plates of the carrier 32 are apertured to permit direct contact of the hammer and the card and between the card and the indicia 52, 54 of the printing member.

The indicia bearing belt 48 is also rigidly mounted in order to insure a clear impression. The pulleys 50 are mounted between plates 140, 142 (FIG. 5) with the plate 142 being secured to the side frames 72, 74 by screws 144. Bars 146 connect the plate 140 with a plate 148 secured to the front panel 120. Lugs 150 secured to plate 148 are fastened to the side walls 72, 74 by screws 152 (FIG. 3). An electric clock motor 154 is secured to the bars 146 and drives, through appropriate gearing, one of the pulleys 50 and the hands for the clock face 24.

The means for operating the carrier 32 and printing hammer 84 include the "in" lever 26 and the "out" lever 28. The "in" lever 26 is pivotally mounted on the shaft 70 and normally held against pin 96 by a spring 94 (FIG. 3) which is caught at its upper end on a pin 97 also projecting from the side wall 72. A pin 98 projects from the lever plate 64 and underlies the lever 26 so that downward movement of the lever 26 will rotate the lever plate 64 and the shaft 70. It will also be seen that a pawl 100 is provided to cooperate with teeth formed in the lever plate 64 to provide what is called a full stroke mechanism. That is, once the lever plate 64 is rotated part way, it is necessary that it be rotated sufficiently to print an impression on the card C before it can return to its initial position.

The mounting of the "out" lever 28 is similar in that it is pivotally mounted on the shaft 70 (FIG. 2) and is normally maintained by a spring 102 in its upper position against a stop pin 104 projecting from the side plate 74 (FIG. 2). The lever 28 is arranged when depressed downwardly to engage a pin 106 projecting from the lever plate 66, thereby imparting rotation to the lever plate 66. The carrier 32 is thereby swung towards the printing unit 46 thus causing an impression to be placed on the card C.

When either the "in" lever 26 or "out" lever 28 is depressed, both the lever plates 64 and 66 are rotated so that the forces swinging the carrier 32 are balanced. On the other hand when one of the levers 26 or 28 is depressed, the other lever remains stationary in its elevated position.

There is a difference, however, in the operation of the device when the "out" lever 28 is depressed. This difference is found in the fact that the second impression on the card C is offset from the first impression with the card being positioned in the same relative location in the holder 32. To accomplish this end, means are provided for bodily lifting the carrier 32 as it is swung toward the printing unit 46. More particularly, it will be seen that the lever 28 is secured as by welding to a sleeve 110 (FIG. 1) which is journaled on shaft 70. The sleeve 110 is provided with a lever arm 112 (see FIG. 2 also) which is connected by a link 114 to a shaft 116. The shaft 116 is mounted on arms 117 which receive its opposite ends. The carrier shaft 40 is mounted on the arms 117 intermediate their lengths, while the arms 117 are pivotally mounted on a fixed shaft 118.

Figure 5:
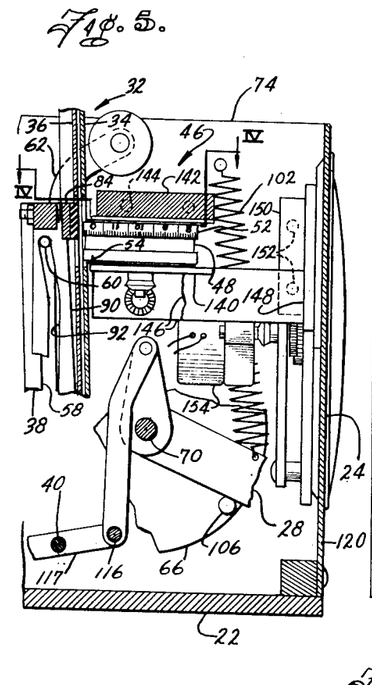
FIG. 5 is a section taken generally on line II—II in FIG. 1, with the certain parts shown in a different position and showing the clock mechanism previously omitted.

When the lever 28 is depressed not only is the carrier 32 swung towards the printing unit, but the link 116 is rotated upwardly causing the shaft 40 to be raised by reason of the levers 117 being raised to the position seen in FIG. 5.

Also secured to the shaft 70 (FIGS. 1 and 7) is a cam 101 having a single tooth 103 which is arranged, upon rotation of the shaft 70, to engage a notch formed on a bar 105. The bar 105 is mounted for sliding movement relative to the side wall 72 by a pin 97 projecting therefrom and passing through a slot in the bar 105. A spring 107 normally maintains the bar 105 in its illustrated position towards the left in FIG. 7. A clapper 109 is pivotally mounted on the bar 105 and arranged to strike a bell 111, with the clapper 109 normally being maintained out of engagement with the bell 111 by a spring 115.

When either the "in" lever or the "out" lever is depressed, the shaft 70 is rotated and the tooth 103 engages the notch in bar 105, pulling the bar 105 towards the right against the resistance of spring 107. This imposes a restraint on the downward movement of either the levers 26 or 28 and causes the operator to increase the manual pressure which he is applying. When the carrier 32 is swung almost to a position adjacent the printing unit 46, the notch in bar 105 is cammed out of engagement with the tooth 103. The sudden release of the force resisting rotation of the shaft 70 causes, by natural reflex action, a substantial pressure on either the "in" lever or the "out" lever which will result in the hammer 84 forcibly striking the card C, thereby assuring a clearly printed impression on the card C.

When the bar 105 is released, the clapper 109 will strike the bell 111 at substantially the same time the card C strikes the printing unit 46. This gives an audible signal each time a worker punches "in" or punches "out."

*Operation*

Figure 6:
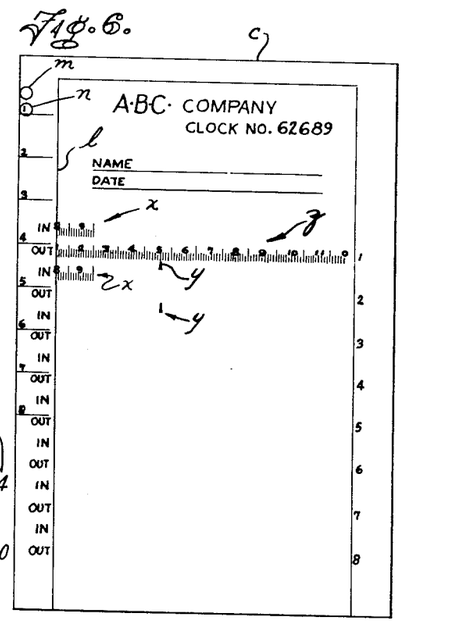
FIG. 6 is a view of a time card used with the clock of the present invention.

The operation of the time clock will now be described by first referring to FIG. 6 which shows, in detail, the card C which is intended for use with the present time clock. A line $l$ is spaced inwardly from the left hand side of the card C and parallel thereto. A series of indicia marks numbered 1, 2, 3, etc., are spaced in descending order along the left hand margin of the card C. Similarly, numerals 1, 2, 3, etc., are provided adjacent the right hand margin of the card C also in descending order and spaced downwardly from the corresponding numerals on the left hand margin. The card C will be pre-printed with the name of the company, the name of the employee, the date, and whatever other information is described, as indicated adjacent the top thereof.

The width of the card C closely approximates the width of the carrier 32 so that the card C will be accurately located in a lateral sense relative to the printing unit 46, when inserted in the carrier 32. The card C is vertically positioned in the carrier 32 with the left hand indicia mark numbered "1" at the top edge of the plate 34. When the "in" lever is depressed, a portion of the indicia 52, indicated at $x$ in FIG. 6, will be printed on the card C. In this connection, it will be noted that the printer hammer 84 has mounted thereon a rubber striking surface 150 (FIG. 1) having a narrow upper portion 152 which presses the card C against the indicia 52 in order to obtain the impression at $x$. The clock mechanism is so adjusted that the line $l$ intersects the indicia impression at a point indicating the time when the worker punches "in." At the same time the worker punches "in," one of the elapsed indicia 54 will also be printed, as indicated at $y$.

Also printed on the card is a mark $m$ immediately above the numeral "1" on the left hand margin. The mark $m$ is printed by a felt 132 (FIG. 3) projecting from an ink supply container 134. The container 134 is mounted on a plate 136 secured to side wall 72. The mark $m$ will indicate to the worker that the "out" lever should be depressed when the next reading is to be printed on the card.

After the "in" lever 26 has been depressed, card C is removed from the clock and placed in a rack, as is usually provided adjacent a time clock. Later, when the worker has finished his work for a given period, the card C is again inserted into the carrier 32 with the indicia mark "1" again positioned at the upper edge of the plate 34. The "out" lever is now depressed, and the carrier 32 swung toward the printing unit 46. Simultaneously the carrier is also shifted upwardly, as previously described. This results in the lower portion of the striking surface 150 pressing a much wider portion of the card C against the indicia 52 to print thereon the impression $z$. The printed impression $z$ intersects the line $l$ at the time the worker "punches" out. In the illustrated example, the worker "punched in at 8:00 o'clock and "punched" out at 1:00 o'clock. The indicium $y$ is disposed below the numeral "5" and automatically indicates that the worker spent 5 hours on the job. The impressions $x$, $y$ and $z$ are printed generally opposite the numeral "1" in the right hand margin, as can be seen. Also when the "out" lever is depressed the felt 132 will print a mark $n$ on the card which will obliterate the numeral "1" and indicate to the worker that the numeral "2" should be positioned at the top of plate 34 when the next time record is printed on the card C.

When the worker returns to work and again punches "in," the card C will therefore be positioned with the indicia line numbered "2" on the left hand margin positioned at the upper edge of the plate 34. The "in" lever will again be depressed and the indicium impressions $x$ and $y$ will again be printed. It will be appreciated, of course, that the number of times the card C will be used will depend upon its length, and theoretically there is no real limit to the length of card which may be employed.

It will also be appreciated that the indicia 52 need not necessarily represent periods of time, but could also be selected to represent the hourly rate at which workers are employed, as might be practical in a shop where all workers are paid at the same rate. This would be considered a full equivalent to any reference herein to indicia representing periods of time.

The embodiment seen in FIGS. 9–17 is adapted to print "in" and "out" times on a similar card 200 (FIG. 18). The card 200 is inserted in a vertically disposed guide 202 (FIGS. 9 and 10) which positions it in a given lateral position. Upon insertion of the card to a proper depth in the guide 202, a hammer 204 is swung to strike the back face of the card and print on the front face thereof an impression of an elongated printing member 208, all of which is later described in detail.

The guide 202 comprises upper front and rear spaced plates 210, 212 having end flanges 214, 216 respectively which are secured to fixed side frames 218 by screws 220. Lower front and rear plates 222, 224 are spaced beneath the plates 210, 212 and have flanges 226, 228 secured to the frames 218 by screws 230. The flanges 216, 228 define the side edges of the guide and are spaced apart a distance closely approximating the width of the card 200 to accurately position it relative to the path of movement of the printing member 208.

The upper and lower pairs of guide plates are spaced apart the minimum distance required for the hammer 204 to print an impression on the card. The lower end of plate 224 is curved beneath the end of plate 222 to deflect the card away from certain operating elements (not shown) of the machine. An extension 232 (FIG. 10) is formed on the plate 212 and in combination with an outbent lip on the plate 224 guides the card across the gap between the two sets of guide plates without interfering with the printing operation.

The hammer 204 comprises a rubber striking pad 234 secured to a bar 236 which in turn is secured to the upper ends of arms 238. The arms 238 are pinned to a shaft 240 which is journaled on the frames 218. A third arm 242 is pinned to the shaft 240 and has a link 244 at its outer end which is connected to the armature 246 of a solenoid 248. A spring 250 connected to a lower extension of the arm 242 normally maintains the hammer 204 in spaced relation from the guide 202 with the arm 242 engaging a stop pin 249.

When the solenoid 248 is energized, the arms 238 are positively rotated until the armature 246 reaches the end of its inward stroke. Thereafter the inertia of the hammer causes it to continue and strike the card in the carrier 200. The slotted connection between arm 242 and link 244 permits such overtravel after the armature 246 has reached the end of its inward stroke. The hammer bar 236 is purposely given a large mass to obtain sufficient inertia for printing a legible impression when the card is struck against the printing member 208.

The printing member 208 comprises a thin strip 252 secured to a bar 254 by screws 256. The printing indicia 258 is formed on the strip 252 and comprises two successive groups of numerals 258a and 258b, each representing a 12-hour period and an elapsed time indicator indicia 260 below the juncture of these two groups.

The bar 254 is provided with grooves 262 which slidingly receive ribs 264 formed on stationary guides 266. The guides 266 are in turn secured to a support member 268 and are held in fixed relation by angle brackets 270 connected to the frames 218 by screws 272. The printing member 208 is yieldingly urged towards its illustrated position in FIGS. 10 and 13 by a constant tension spring 274. The spring 274 is of known design and comprises an elongated metal strip which is connected to the bar 254 by a screw 276. The action of the spring 274 is such that it tends to coil around a pin 278 mounted on the support bar 268 and thereby exert a substantially constant tension on the screw 276 urging the bar 254 to the illustrated position, as indicated above.

The printing member 208 is progressively advanced along the guides 266 by mechanism which includes a synchronous timer motor 280 having an output shaft 282. A driving ratchet 284 is secured to the shaft 282 and has pawls 286 which alternately engage a latch tooth 288 to rotate a drum 290 rotatably mounted on the shaft 282. The latch tooth 288 projects from a latch plate 291 which is slidably received in a transverse slot 292 formed in the drum 290. A slot 293 is formed in the latch plate 291 to provide clearance for the shaft 282. A spring 294 extending between the latch plate 291 and the drum 290 normally maintain the latch tooth 288 in driving engagement with one or the other of the pawls 286.

One end of a cord 295 is connected to the drum 290 and adapted to be wound therearound. The opposite end of the cord 295 is secured to the screw 276 projecting from the printing member bar 254 through an elongated slot 296 in the support member 268. As the shaft 282 rotates in a clockwise direction (FIG. 12), the drum 290 is rotated in the same direction, being driven by the pawl 286 engaged with the latch tooth 288.

Figure 13:
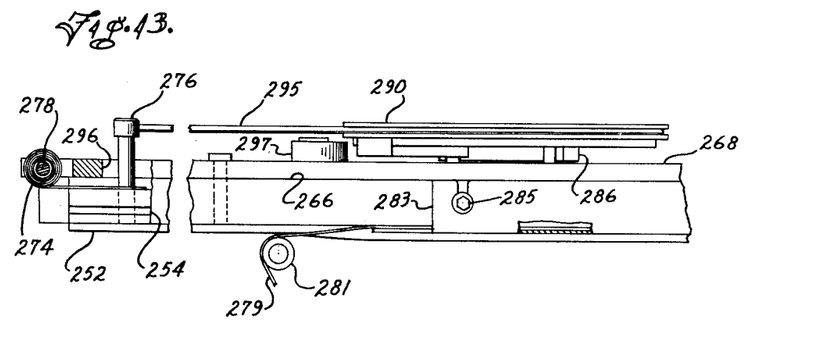
FIG. 13 is a section taken substantially on line XIII—XIII in FIG. 10.
Figure 14:
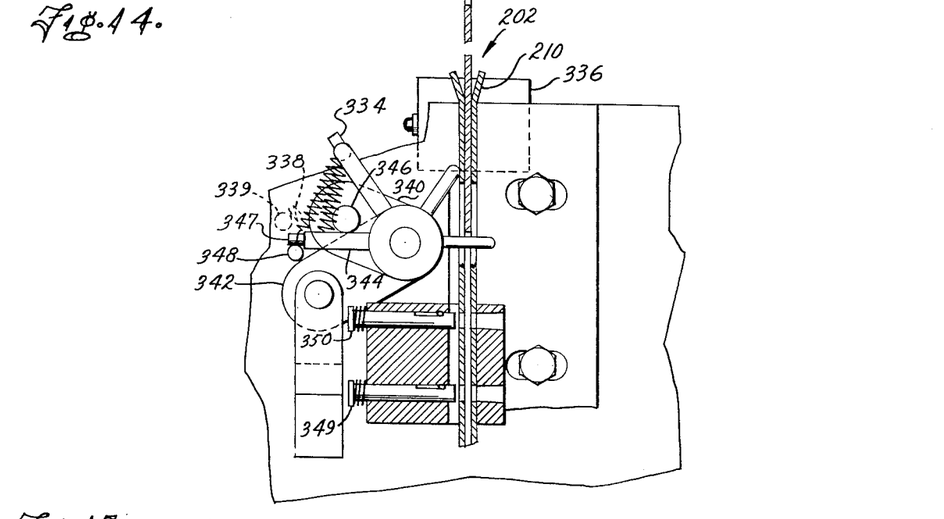
FIG. 14 is a section on an enlarged scale taken on line XIV—XIV in FIG. 10.
Figure 15:
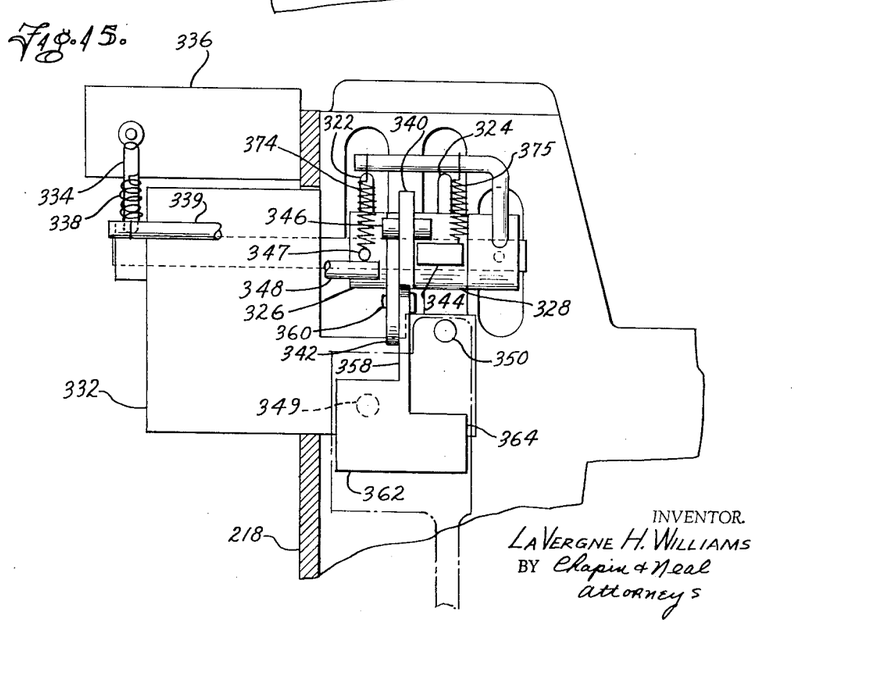
FIG. 15 is a view taken on line XV—XV in FIG. 14.

As herein contemplated, the printing member 208 will be uniformly advanced by the motor 280 in the described fashion for a 12-hour period, at the end of which the printing member will be returned to its illustrated start position by the spring 274 (FIG. 13). To disengage the latch tooth 288 from the operative pawl 286, a roll 297 is provided. As the drum 290 rotates, a cam face 298 at one end of the latch plate 291 will engage the roll 297 and displace the latch plate 291 in the slot 292 finally disengaging the latch tooth 288 from the operative pawl 286 at precisely the end of the 12-hour period. The roll 297 is mounted on a concentric in order to accurately obtain this timed release and permit the return of the printing member to its start position.

During return movement of the printing member 208 the drum 290 rotates in a counterclockwise direction, as cord 295 is unwound therefrom, to a position limited by engagement with a stop stud 299. At this time the opposite pawl 286 engages the tooth 288 to again rotate the drum 290 and begin a subsequent advance of the printing member 208 in the desired timed relation. The stud 299 is also mounted in an eccentric fashion so as to be accurately adjusted for engagement with a face 300 on the latch plate 291 and thereby accurately locate the printing member in its start position without imposing any undue stress on the pawls 286 which could also have harmful effects if transmitted through the shaft 282 to the driving motor 280.

Figures 10, 11:
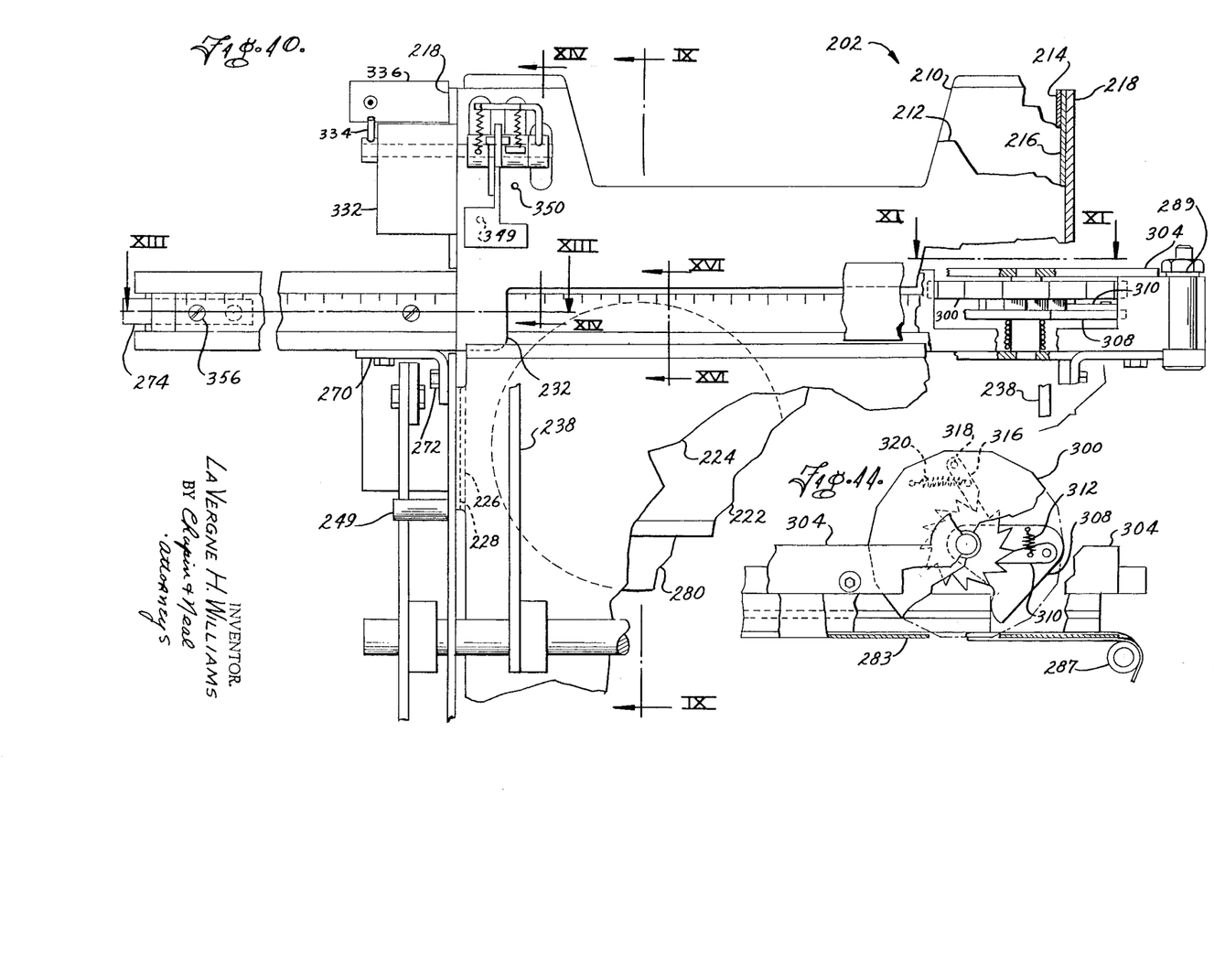
FIG. 10 is a rear elevation of this mechanism.
FIG. 11 is a section taken on line XI—XI in FIG. 10.
Figure 12:
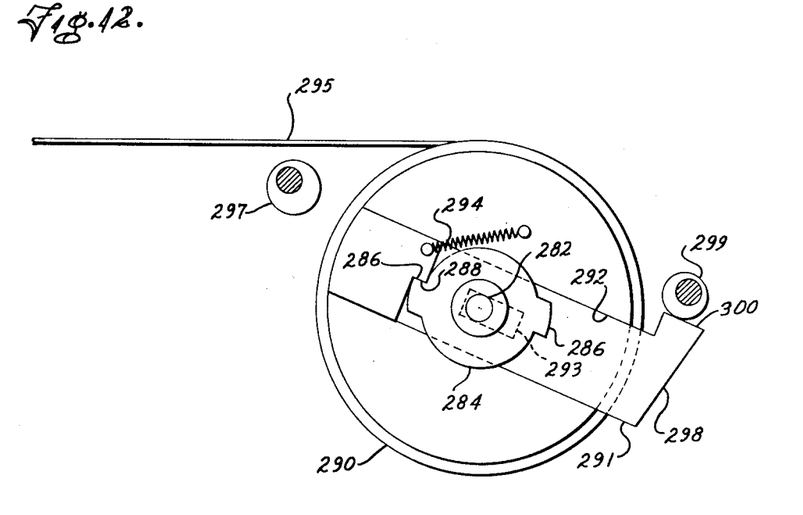
FIG. 12 is a view taken on line XII—XII in FIG. 9.

While reference is made to actually impressing the card 200 against the printing member 208, an ink ribbon 279 is preferably employed (FIGS. 11, 13 and 16). The ribbon 279 passes over a roll 281 and has its marginal edges confined by guides 283 secured to the printing member guides 266 by screws 285. The central portion of the ribbon 279 is thus maintained relatively taut along the length of the printing member 208 which will be employed in printing an impression on the time card. At the opposite ends of the ribbon guides 283 is a second guide roll 287 which depends from an angle bracket 289 secured to the support member 268. The ribbon 279 extends from the rolls 281, 287 to reels (not shown) which are rotated in first one direction and then another to continually advance successive portions of the ribbon along the printing member using conventional mechanism as employed on typewriters or the like with such mechanism being actuated by movement of the printing hammer 204.

It is also desirable to print on the time card an indication of the day of the week and whether an impression has been printed in the a.m. or p.m. The following means are provided for this purpose. A date wheel 300 has 14 printing faces respectively bearing indicia indicating Monday, a.m., Monday, p.m., Tuesday, a.m., Tuesday, p.m., successively. The date wheel is rotatably mounted on a shaft 302. The shaft 302 is shouldered and journaled between plates 304 which are secured to the support member 268.

Successive faces of the date wheel 300 are brought into the plane of the indicia bearing face of printing strip 252 upon each reciprocation of the printing member 208. For this purpose a ratchet wheel 306 is secured to the date wheel 300 and has 14 teeth corresponding to the 14 faces of the date wheel. A pawl carrier 308 is pivotally mounted on the shaft 302 and has a pivotally mounted pawl 310 thereon which is urged into engagement with the teeth of the ratchet wheel 306 by a spring 312. A torsion spring 314 is coiled about the shaft 302 and urges the pawl carrier 308 in a clockwise direction. The pawl carrier 308 projects into the path of travel of the printing member 208 in its start position. As the printing bar moves from this start position (to the right in FIG. 11), the pawl carrier 308 is displaced in a counterclockwise direction. As this occurs, the date wheel 300 remains stationary, preferably by reason of the provision of a holding pawl 316 which is pivotally mounted on a fixed pin 318 and urged into engagement with the ratchet wheel 306 by a spring 320. When the printing member 208 has completed its travel to the right and is then returned to its start position by the spring 274, as above described, torsion spring 314 rotates the pawl carrier 308 to index the date wheel and bring the next successive printing face into the plane of the outer face of the printing strip 252 so that it will be positioned to print an impression when the card is struck by the hammer 208. It will be noted that the upper ribbon guide 283 is broken away to maintain the upper marginal portion of the ribbon 279 taut across the faces of the date wheel as they are thus indexed into printing position.

It is also preferable that the hammer 208 have a separate striking face for printing the date wheel impression. A separate rubber pad 321 (FIG. 9) is provided for this purpose. The outline of the pad 321 and the outline of pad 234 for printing the time indicating indicia are best indicated by the phantom showing in FIG. 18.

Successive insertions of the card 200 to a predetermined depth in the carrier 202 automatically energizes solenoid 276 to cause vertically offset impressions of the printing member 208 to be printed thereon. The means for attaining these ends comprise a pair of fingers 322, 324 (FIGS. 14 and 15) projecting respectively from collars 326, 328 which are rotatable on a shaft 330. The shaft 330 is journaled in a fixed block 332 which projects through an opening in and is secured to the adjacent frame 218. Appropriate means are provided for locking shaft 330 in an axial sense.

An arm 334 secured to shaft 330 is adapted to contact a switch 336 to close the contacts thereof and actuate the solenoid 248 through an appropriate electrical circuit. Spring 338 extending from a fixed pin 339 normally maintains arm 334 displaced from the switch 336 and also rotates arm 340 secured to shaft 330 to the position shown in FIGS. 14 and 15. Arms 342, 344 project from the collars 326, 328 respectively and engage a cross pin 346 projecting from the arm 340. A pin 347 projects from collar 326 and engages a fixed pin 348 to position the pins 322, 324 and arm 334 in their illustrated positions yieldably maintained by spring 338.

A pair of punches 349, 350 are vertically aligned with and spaced beneath the pins 322, 324, respectively. The punches 349, 350 are slidable in an extension of block 332, and are aligned with corresponding openings in a fixed die block 352 which is mounted in an appropriate opening in the front guide plate 210. The punches 349, 350 are flattened intermediate their lengths and pins 354 retain them in the block 332. Springs 356 act against heads on the outer ends of the punches 349, 350 to normally maintain the punches spaced from the card guide 202.

An interpose 358 is connected to the arm 342 by a pin 360 and has legs 362, 364 which selectively overlie the punches 349, 350, respectively. The adjacent hammer arm 238 has an extension 366 which is disposed to strike the interpose 358 upon being swung by the solenoid 248 to print an impression on the card 200.

The card 200 (FIG. 18) initially has a pre-formed hole 380 which is aligned with the pin 322 when the card is inserted in the guide 202. As the card 200 is so inserted, its lower end strikes an arm 368 which projects from a collar 369 that is rotatable on the shaft 330. Slots 370, 371, 372 are formed in the guide plates 210, 212 to provide clearance for the pins 322, 324 and arm 368. An offset arm 373 projects from the collar 369 and is connected by springs 374, 375 to the pin 347 and arm 344. As arm 368 is rotated by the lower end of the card 200, pins 322, 324 yieldingly bear against the rear face of the card under the influence of springs 374, 375.

Upon the card 200 reaching the proper depth in the guide 202, finger 322 enters the hole 380 and further downward movement of the card positively rotates this finger and shaft 330 in a clockwise direction (FIG. 14) causing arm 334 to close the contacts of switch 336 to actuate solenoid 248. The impression thus imprinted is indicated by reference character 382 in FIG. 18.

It is assumed that the impression 382 was printed with the draw bar displaced from its illustrated start position and made at precisely 8:00 a.m. It will be seen that a vertical line 384 on the card 200 falls at the "8" indication so that the "in" time may be readily ascertained. The date wheel has stamped the day and the fact that it is an a.m. reading to the left of the line 384. Also, the indicator indicia 260 has printed an indicator m immediately beneath the line of time indications.

Simultaneously with the printing of impression 382, a second hole 386 is formed on the card 200 by the punch 350. It will be noted that as the pin 322 is rotated by the hole 380 to actuate the printing mechanism the interpose 358 is drawn to an upper position in which its leg 364 overlies the punch 350 and the leg 362 is spaced above the punch 349. Thus, when the hammer extension 366 strikes the interpose, only the punch 350 is actuated.

After the "in" time has been so registered, the card 200 would normally be stored in an appropriate rack until the worker quits for lunch, at which time the card would again be inserted into the guide 202. This subsequent insertion of the card again causes the fingers 322, 324 to yieldingly bear against the rear face of the card. The hole 386 being lower than the hole 380, only the finger 324 will be rotated to impart rotation to the shaft 330 through the cross pin 346 and arm 340. Again the contacts of switch 336 will be closed to actuate the solenoid 248 and the hammer will swing inwardly to print a second impression indicated at 388 on the card 200. The second impression is spaced immediately beneath the first impression 382 with the printed time indicia falling on line 384 enabling the "out" time to be readily ascertained. Again there will be an impression from the date wheel further specifying the time at which the printing is made. In the present instance the "out" time is at precisely 12:00 noon where the date wheel has just been indexed to its Monday, p.m. position. The elapsed time between the "in" and "out" times is 4 hours and the indicator m from the first impression lies immediately above the numeral "4" in the second impression thereby enabling ready calculation of the elapsed time upon which payment is to be made.

Since the finger 322 does not rotate about the axis of shaft 330 in printing the second impression, the interpose 358 remains stationary with its leg 362 overlying the punch 349 and the leg 364 spaced beneath the punch 350. The interpose is thus positioned to engage only punch 349 when struck by the hammer extension 366. A third hole 390 is formed in the card 200 by the punch 349, this hole being spaced beneath the hole 386 a greater distance than the hole 386 is spaced beneath the hole 380. It will be seen also that the holes in the card are alternately offset in a lateral sense for alternate engagement with pins 322, 324.

Thus, when the card is inserted for a third time into the guide 202, finger 322 again actuates the printing mechanism as the hole 390 is the lowest hole on the card. Actuation of the printing mechanism by the hole 390 results in an impression created at 394 which is spaced a greater distance beneath the impression 388 than the impression 388 is spaced beneath the first impression 382. A fourth hole 396 is formed in the card 200 by the punch 350 and upon a subsequent insertion of the card into the carrier, this hole actuates the mechanism to print a fourth impression 398. The impressions 394, 398 thus represent, in the normal course of work, the "in" and "out" times for the afternoon and in the illustration show that the "in" time was 12.9 p.m. and that the "out" time was at 5.1 p.m., with an elapsed time of 4.2 hours being designated by the indicator impression n printed with the impression 394.

The described means automatically group successive "in" and "out" times in spaced relationship so that the elapsed time may readily be ascertained from the elapsed time indicator printed on each "in" impression. The elapsed time indicator printed on the "out" reading has no function but is spaced from the following "in" time impression so as to avoid any possibility of confusion.

The actuating means employed herein to so space the successive printings most conveniently takes the form of holes which are physically entered by pins as described. However, it is to be recognized that other means could be employed, for example, spots of conductive ink could be successively printed on the card to complete appropriate electrical circuits and the holes 380, etc., are thus referred to in a broader sense as being "locators" which give indication of the time card being in a desired position relative to the carrier for actuating the printing mechanism.

Having thus described the invention, what is claimed as novel and desired to be secured by Letters Patent of the United States is:

1. A time clock for printing two different times on a time card, said time clock comprising a printing member bearing a single line of time indicating printing elements, said printing elements comprising at least two successive groups of numerals with each group indicating the hours in a given period, clock mechanism for advancing said printing member along a given path, means for positioning the card in predetermined widthwise relation along the path of travel of said printing member and facing said printing elements, and pressing the card and printing member together and printing thereon an impression of a portion of said time indicating printing elements and for thereafter pressing the card and printing member together, with the card in the same widthwise relation along the path of travel of said printing member and with said line of printing elements offset in a lengthwise sense of the card from the first impression to print on the card a second impression of a portion of said time indicating printing elements.

2. A time clock for printing two different times and indicating the elapsed time therebetween on a card, said time clock comprising a printing member bearing a single line of time indicating printing elements, said printing elements comprising at least two successive groups of numerals, with each group indicating the hours in a given period and an elapsed time indicator printing element at each juncture of adjacent groups, means for advancing said printing member along a given path, means for positioning the card in predetermined widthwise relation along the path of travel of said printing member and facing said printing elements and pressing the card and printing member together and printing thereon an impression of a portion of said time indicating printing elements and an impression of said elapsed time indicator printing element and for thereafter pressing the card and printing member together with the card in the same widthwise relation along the path of said printing member and with said line of printing elements offset in a lengthwise sense of the card from the first impression and printing on the card a second impression of a portion of said time indicating printing elements in juxtaposition to the impression of said elapsed time indicator printing element.

3. A time clock for printing two different times and indicating the elapsed time on a card having a longitudinal line running lengthwise thereof, said time clock comprising an elongated printing member bearing a single line of time indicating printing elements, said printing elements comprising at least two successive groups of numerals, with each group indicating the hours in a given period, and an elapsed time indicator printing element at each juncture of adjacent groups, clock mechanism for advancing said printing member along a path in the direction of the elongate dimension thereof, a card carrier receiving the card and positioning it facing at least a portion of said printing elements and in predetermined widthwise relation along the path of travel of said printing member with the longitudinal line of the card transverse to the path of travel of said printing member and in opposed relation to the portion of the time indicating elements which reflects the time of day, means for imparting relative movement between the carrier and the printing member, pressing the printing member thereagainst and printing thereon an impression of at least the portion of said time indicating printing elements opposed to the longitudinal line on said card to indicate the "in" time and also printing an impression of said elapsed time indicator printing element and thereafter imparting between said carrier and said printing member and pressing the two together with the printing member offset in a lengthwise sense of the card from the first impression and upon the second pressing together of the card and the printing member, and printing a second impression of said time indicating elements on said card in juxtaposition to the elapsed time indicator printing element to indicate the time elapsed since the "in" time.

4. A time clock for printing two different times on a time card, said time clock comprising a printing member bearing time indicating printing elements, clock mechanism for advancing said member along a given path, a carrier for receiving a time card and positioning same for engagement with a portion of said printing elements, means for moving said carrier towards and away from said member, said moving means including a manually operated "in" lever for operating said moving means and pressing the card against the printing member to print thereon an impression of a portion of said time indicating printing elements, said moving means further including a manually operated "out" lever for operating said moving means with this card in the same position relative to the carrier and pressing the card against the printing member with the first impression thereon offset from said time indicating printing elements in lengthwise relation of the card to print thereon a second impression of a portion of said time indicating printing elements in offset relation to said first impression.

5. A time clock for printing two different times on a card, said time clock comprising a printing member bearing time indicating printing elements, clock mechanism for advancing said member along a given path, a carrier for receiving a time card and positioning same for engagement with a portion of said printing elements, means for pivotally mounting said carrier for movement towards and away from said printing member, yieldable means resisting movement of said carrier towards said printing member, means for releasing said resisting means in response to movement of said carrier to a position adjacent said printing member, means including a manually operated "in" lever for swinging said carrier towards said printing member and pressing the card thereagainst to thereby print on said card an impression of a portion of said time indicating printing elements and means including a manually operated "out" lever for swinging said carrier with the card in the same relative position thereto and pressing the card against said printing member with the first impression thereon offset from said time indicating printing elements in lengthwise relation of the card to print thereon a second impression of a portion of said time indicating printing elements in offset relation to said first impression, the release of said resisting means being effective to assure sharp and clear impressions on said card.

6. A time clock as in claim 5 wherein the means for swinging said carrier include means for shifting said carrier in a direction normal to the axis about which it is swung in response to operation of one of said levers to thereby offset the second impression from the first impression.

7. A time clock as in claim 4 wherein means are provided for simultaneously printing a mark on said card each time an impression is printed thereon in response to operation of said levers, the means for printing said mark being spaced from the printing member so that the mark provided thereby readily gives a visual indication as to what impression has been made and whether the "in" or "out" lever should next be operated.

8. A time clock comprising a horizontally disposed endless printing member bearing on its vertical face time indicating printing elements arranged in a single line along its length and comprising a plurality of consecutively arranged groups of time indicating printing elements with each group indicating the hours in a given period, and further comprising an elapsed time indicator printing element at each juncture of adjacent groups, said indicator printing element being vertically spaced from said line of time indicating printing elements, clock mechanism for advancing said printing member along a given path, a carrier for receiving a time card and positioning same for engagement with a portion of said printing elements, means for pivotally mounting said carrier for movement about a horizontal axis toward and away from said printing member, said axis being spaced beneath said printing member, a striking hammer opposed to said member and engageable with said card on the side thereof opposite said printing member, said striking hammer comprising upper and lower portions which are relatively short and wide, respectively, means including a manually operated "in" lever for swinging said carrier towards said member and also forcibly striking said hammer against said card with the relatively narrow portion thereof opposite said time indicating indicia and the relatively wide portion opposite at least one of said elapsed time indicator printing elements to print on said card an impression of a portion of said time indicating printing elements and also an impression of one of said elapsed time indicator printing elements and means including a manually operated "out" lever for swinging said carrier with the same card in the same relative position thereto towards said member and also forcibly striking said hammer against said card with the wide portion thereof opposite said time indicating printing elements to thereby print on said card a second impression of said time indicating printing elements in offset relation with said first impression and juxtapositioned to the impression of said elapsed time indicator printing element.

9. A time clock comprising a printing member having time indicating printing elements thereon, clock mechanism for advancing said member along a given path, a carrier for receiving a time card and positioning same for engagement with a portion of said printing member, said carrier comprising a pair of spaced plates defining a slot having a width approximating the width of the time card, a pair of levers to which opposite sides of the plates are secured, a horizontal carrier shaft spaced beneath the printing member and on which said levers are mounted for swinging movement of said carrier towards and away from said printing member, the carrier plate adjacent said printing member having an opening therein aligned with said printing member and permitting contact between said member and said card, said levers having vertical slots therein, a second shaft parallel to the carrier shaft, a pair of lever plates secured to said second shaft, linkage means connecting said lever plates and said carrier levers and including pins entering the slots in the carrier levers for swinging said carrier towards said member in response to pivotal movement of said lever plates, an "in" lever engageable with one of said lever plates for so swinging said carrier and placing on said card an impression of a portion of said time indicating printing elements, an "out" lever engageable with the other of said lever plates for swinging said carrier towards said member and placing on said card an impression of a portion of said time indicating printing elements, and means responsive to movement of one of said "in" and "out" levers for displacing the carrier in a direction radially outwardly of said carrier shaft whereby the second impression is offset from the first impression.

10. A time clock as in claim 9 wherein the linkage means comprise a link pivotally connected to each of said lever plates, an ink roll shaft parallel to said carrier shaft, said ink roll shaft being pivotally received by said links above the connections between the carrier levers and said links, a pair of plates having cam slots respectively receiving the outer ends of said ink roll shaft, an ink roll mounted on said shaft and movable past said member to deposit ink thereon in response to movement of said lever plates, said cam slots in combination with the slots in said carrier levers controlling movement of said carrier and swinging same towards said printing member, and further displacing said inking roll away from said carrier once the inking roll has been elevated above said printing member.

11. A time clock as in claim 9 wherein the printing member is in the form of an endless belt, a pair of pulleys around which the belt is trained with a run thereof lying in a vertical plane parallel to the axis of the carrier shaft, said time indicating printing element comprising a single line along the length of said belt and arranged in consecutive groups with each group comprising numerals indicating the hours in a given period, an elapsed time indicator printing element is spaced below the initial numeral of each group and further wherein the striking hammer is opposed to a portion of the time indicating printing elements and one of the elapsed time indicator printing elements when the "in" lever is operated to swing the carrier, and the hammer is opposite said line of time indicating printing elements and spaced above the elapsed time indicator printing elements when the carrier is swung and elevated by the "out" lever.

12. A time clock as in claim 9 wherein the carrier shaft is pivotally mounted on a pair of levers normal thereto, said mounting levers being pivotal at one end about a fixed common axis, and linkage means connecting said mounting levers and said "out" lever to raise the mounting levers and the carrier in response to movement of the "out" lever to swing the carrier towards the printing member whereby the second impression will be offset from the first impression.

13. A time clock comprising a printing member having a single line of time indicating indicia, said indicia comprising at least two groups of numerals indicating the hours in a given period, clock mechanism for advancing said member along a given path, a guide for receiving a time card having a locator thereon, said guide positioning said card in fixed longitudinal relation relative to the path of advance of said printing member, a hammer and means for moving the hammer to strike the card and print an impression of said printing member thereon, operating means actuated by the locator on the card for initiating operation of said hammer operating means upon insertion of said card into said guide to a given position to thereby print on the card an impression of a portion of said indicia and means also actuated by the locator for forming on said card a second locator spaced beneath said locator, whereby upon a subsequent insertion of the card into said guide the same hammer will be operated to print a second impression thereon of a portion of said indicia which is offset from and closely adjacent the first impression.

14. A time clock as in claim 13 wherein means are provided for forming third and fourth locators on said card upon subsequent insertions thereof into the carrier, with the third and fourth locators having the same relative spacing therebetween as between the first two locators, and wherein the spacing between the second and third locators is greater to thereby separate subsequent impressions printed on the card into groups of two.

15. A time clock as in claim 13 wherein the locator takes the form of a hole formed in the card adjacent one side edge thereof, a pin is provided and means responsive to insertion of the card in the guide cause the pin to yieldably bear against the card and enter said hole, said operating means including a switch closed in response to said pin entering said hole and further wherein the means for forming the second locator comprise a punch and means responsive to said hammer operating means for causing said punch to form a second hole in the card.

16. A time clock as in claim 15 wherein said punch forms said second hole in laterally offset relation to said first hole, and further wherein a second punch is provided for forming a third hole in said card spaced beneath said second hole a greater distance than said second hole is spaced beneath said first hole, with said third hole being vertically aligned with said first hole and further wherein a second pin, aligned with said first punch, is provided for entering said second hole and means responsive to said second pin entering said second hole to cause said switch to again actuate said hammer operating means and means are provided for selectively actuating only said first punch when said first pin enters said first hole and said second punch when said second pin enters said second hole whereby upon successive insertions of the card into said guide the impressions printed on said card will be in spaced pairs.

17. A time clock as in claim 16 wherein the printing member has two successive groups of indicia, each indicating a 12-hour period, and an indicator indicia beneath the juncture of these two groups and further wherein the space between the first and second holes formed on the cards is substantially the same as the height of said printing member and further wherein the card has a lengthwise line and the advance of the printing member is timed so that the impressions printed on said card intersect said line to indicate the exact times when the impression was made, with the impression of the indicator made in response to said first pin entering a hole in the card overlying the second impression at a point indicating the elapsed time between two impressions.

18. A time clock as in claim 13 wherein the printing member takes the form of a straight bar, a clock motor is provided having a drum rotatable on the output shaft thereof, a cord adapted to be wound around said drum is connected to said printing member for the advance thereof, a driving member is secured to said output shaft and has two pawls, a latch member is mounted on said drum and engageable with one or the other of said pawls for rotating said drum and means for releasing said latch member from the pawl engaged therewith upon the printing member having been advanced a predetermined distance, spring means for returning the printing member to a start position upon said release and rotating said drum in a reverse rotation to bring said latch member into engagement with the other of said pawls.

19. A time clock for printing two different times on a time card, said time clock comprising a printing member bearing a single line of time indicating printing elements, said printing elements comprising at least two successive groups of numerals indicating the hours in a given period, clock mechanism for advancing said printing member along a given path, a guide for receiving a time card and positioning same in fixed relation relative to the path of advance of said printing member, means responsive to insertion of said card into said guide for pressing the printing member against said card to print thereon an impression of a portion of said indicia and means responsive to the next subsequent insertion of said card into said guide for automatically pressing said printing member against said card with the line of time indicating printing elements offset from and closely adjacent to said first impression in a lengthwise sense of the card to thereby print on said card a second impression of said time indicating printing elements in offset and closely adjacent relation to said impression.

20. A time clock as in claim 19 wherein means responsive to a third insertion of the card in said guide are provided for automatically pressing said printing member against said time card with the line of time indicating printing elements offset and spaced further from said second impression in a lengthwise sense of the card to thereby print on said card a third impression of said time indicating printing elements in offset relation and further spaced from said second impression, and further wherein the means for obtaining the closely spaced relation between the first and second elements will automatically become effective upon a fourth insertion whereby the impressions on the cards will be segregated into groups of two.

References Cited by the Examiner

UNITED STATES PATENTS

| | | | |
|---|---|---|---|
| 875,392 | 12/07 | Tran et al. | 346—17 |
| 1,065,501 | 6/13 | Bishop | 346—1 |
| 1,168,548 | 1/16 | Quigley | 346—1 |
| 1,207,491 | 12/16 | Bryce | 235—61.11 |
| 2,229,696 | 1/41 | Engst | 346—94 |
| 2,470,961 | 5/49 | Vannini | 346—48 |
| 2,496,686 | 2/50 | Williams | 346—82 |
| 2,819,939 | 1/58 | Dull | 346—87 |
| 2,874,020 | 2/59 | Esler | 346—85 |

LEYLAND M. MARTIN, *Primary Examiner.*